United States Patent [19]

Yoshida

[11] 4,432,215
[45] Feb. 21, 1984

[54] PRESSURE DIFFERENTIAL AUTOMATIC TRANSFER TYPE THREE-WAY VALVES

[75] Inventor: Shoichi Yoshida, Fuji, Japan

[73] Assignee: Tokyo Shibaura Denki Kabushiki Kaisha, Kanagawa, Japan

[21] Appl. No.: 401,564

[22] Filed: Jul. 26, 1982

[30] Foreign Application Priority Data

Aug. 3, 1981 [JP] Japan .................................. 56-121627

[51] Int. Cl.³ ............................................. F25B 13/00
[52] U.S. Cl. ..................................... 62/324.6; 62/160; 137/625.29
[58] Field of Search ............................... 62/160, 324.6; 137/625.29

[56] References Cited

U.S. PATENT DOCUMENTS

| | | | |
|---|---|---|---|
| 2,976,701 | 3/1961 | Greenawalt | 62/160 X |
| 3,225,557 | 12/1965 | Miller | 62/160 X |
| 4,178,768 | 12/1979 | Pauliukonis | 62/160 |
| 4,213,483 | 7/1980 | Bauer | 137/625.29 |
| 4,290,453 | 9/1981 | Bauer | 137/625.29 |

Primary Examiner—Lloyd L. King
Attorney, Agent, or Firm—Stevens, Davis, Miller & Mosher

[57] ABSTRACT

In a pressure differential automatic transfer type three-way valve utilized in a heat-pump type refrigeration system together with a transfer valve for transferring an operating state of the refrigeration system, the three-way valve is formed with a leakage passage having a leakage resistance determined by flow resistance of the transfer valve, leakage resistance thereof and flow resistance of the three-way valve.

15 Claims, 32 Drawing Figures

PRESSURE DIFFERENTIAL AUTOMATIC TRANSFER TYPE THREE-WAY VALVES

BACKGROUND OF THE INVENTION

This invention relates to a pressure differential automatic transfer type three-way valve utilized in a heat pump type refrigeration system.

Figure 1:
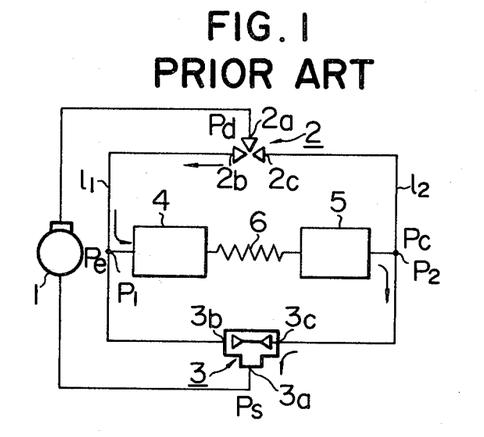
FIG. 1 is a diagram showing a prior art heat pump type refrigeration system in which a pressure differential valve is installed on the low pressure side of a compressor, the system being in a heating operation.

As shown in FIG. 1, in a prior art heat pump type refrigeration system, an electromagnetically transferred three-way valve 2 (hereinafter merely called transfer valve 2) is provided on the discharge side of a compressor 1, and a pressure differential automatic transfer type three-way valve 3 (hereinafter merely called pressure differential valve 3) is provided on the suction or low pressure side of the compressor 1.

Between the transfer valve 2 and the pressure differential valve 3 are connected an indoor heat exchanger 4 and an outdoor heat exchanger 5 which are interconnected by a pressure reducing device 6 in the form of a capillary tube 6, etc. As is well known, the operation of the heat exchangers is transferred between a condenser and an evaporator depending upon whether the refrigeration system is operated as a heater or a cooler. The first port 2a of the transfer valve 2 is connected with the discharge side of the compressor 1, the second port 2b is connected with the second port 3b of the pressure differential valve 3 through a pipe l₁, and the third port 2c of the transfer valve 2 and the third port 3c of the pressure differential valve 3 are interconnected through a pipe l₂. The first port 3a of the pressure differential valve 3 is connected with the suction side of the compressor 1. Both heat exchangers 4 and 5 and the pressure reducing device 6 are connected in series across junctions $P_1$ and $P_2$ of the pipes l₁ and l₂.

Figure 2:
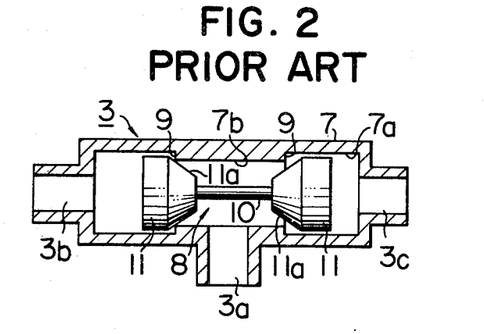
FIG. 2 is a longitudinal sectional view showing a prior art pressure differential valve.

As shown in FIG. 2, the differential pressure valve 3 comprises a cylindrical casing 7 and a slider 8 contained therein. The second port 3b and the third port 3c are formed on both sides of the casing 7, while the first port 3a is formed at a central portion thereof. Valve seats 9 are formed on the inner surface of the casing 1 near the center thereof. The slider 8 includes a pair of valve members 11 mounted on both ends of a shaft 10 to be slidable in respective large diameter portions 7a on both sides of the casing 7. When inclined or conical surfaces 11a of the valve members 11 engage the valve seats 9 at both ends of a small diameter portion 7b formed at the central portion of the inner surface of the casing 7, either one of the second port 3b and the third port 3c is closed. Thus, as the slider 8 is moved to the left or right, the flow of refrigerant is transferred.

In the refrigeration system described above, during the heating operation, the second port 2b of the transfer valve 2 is opened, its third port 2c is closed, while the pressure differential valve 3 assumes a state shown in FIG. 2 in which the slider 8 is moved toward right, thus closing the second port 3b and opening the third port 3c. Consequently, the refrigerant flows through a closed circuit including compressor 1, second port 2b of the transfer valve 2, indoor heat exchanger 4, pressure reducing device 6, outdoor heat exchanger 5, third port 3c of pressure differential valve 3 as shown by solid line arrows in FIG. 1.

At this time, the pressure Pd at the first port 2a of the transfer valve 2 and the pressure Pe at the junction $P_1$ are high, whereas the pressure Pc at the junction $P_2$ and the pressure Ps at the first port 3a of the pressure differential valve 3 are low.

To transfer the operation from the heating operation to the cooling operation, the transfer valve 2 is operated to open the third port 2c and to close the second port 2b. Then, at the instant of transfer, the refrigerant flows as shown by solid line arrows shown in FIG. 3. More particularly, the refrigerant flows from the third port 2c of the transfer valve 2 through pipe l₂, the third port 3c and the first port 3a of the pressure differential valve 3. However, leakage is inevitable for the transfer valve 2 so that the leaked refrigerant flows through a shunt circuit between the second port 2b and the junction $P_1$ through both heat exchangers 4 and 5 and the pressure reducing device 6 as shown by dotted line arrows in FIG. 3.

Figure 3:
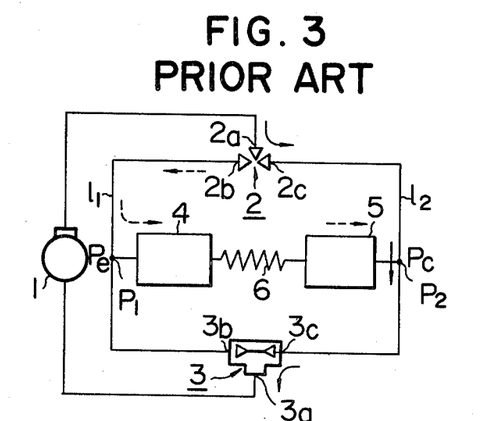
FIG. 3 is a diagram showing the refrigeration system shown in FIG. 1 when it is transferred to the heating operation.

Under this state, pressure Pe is applied to the second port 3b of the pressure differential valve 3, while pressure Pc is applied to the third port Pc thereof with the result that a differential pressure Pe−Ps is applied to the slider 8 on its side of the second port 3b, while a differential pressure Pc−Ps to the slider on its side of the third port 3c.

Since the leaked refrigerant flows in the direction of dotted line arrows, the pressure Pe becomes higher than pressure Pc to establish a relation Pe−Ps>Pc−Ps which the result that the slider 8 is still maintained in the state shown in FIG. 2 so that operation cannot be transferred to the cooling operation.

Figure 4:
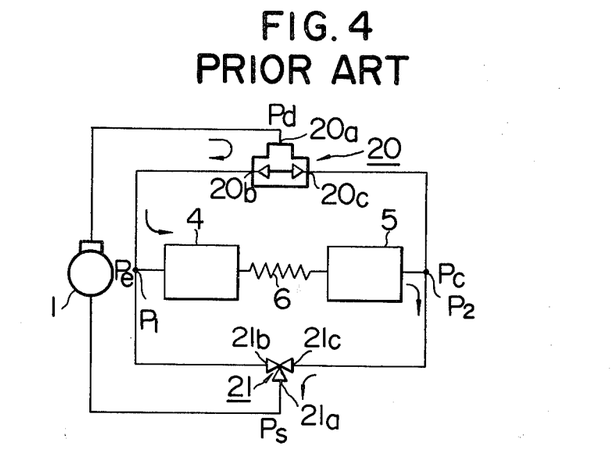
FIG. 4 is a diagram showing a prior art heat pump type refrigeration system at the time of heating operation wherein a pressure differential valve is provided on the high pressure side.
Figure 5:
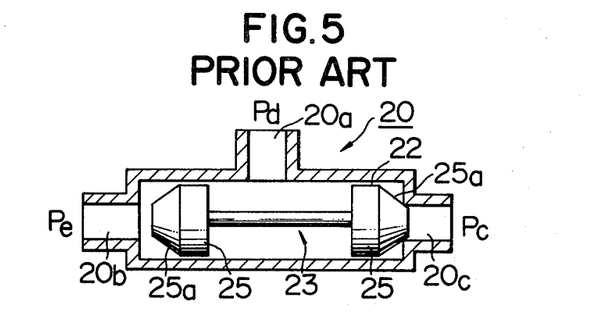
FIG. 5 is a longitudinal sectional view showing the pressure differential valve utilized in the refrigeration system shown in FIG. 4.

It has also been proposed to install a pressure differential valve 20 on the discharge or output side of the compressor 1 and to install a transfer valve 21 on the suction side of the compressor 1, as shown in FIG. 4. As shown in FIG. 5, the pressure differential valve 20 utilized in this system comprises a cylindrical casing 22 and a slider 23 contained therein. A first port 20a is formed at the center of the casing 22 and the second and third ports 20b and 20c are formed on the opposite ends of the casing. These two ports are ON-OFF controlled by inclined or conical surfaces 25a of valve members 25 on both ends of the shaft of slider 23, thus switching the flow of the refrigerant.

In this refrigeration system, during the heating operation shown in FIG. 4, the third port 21c of the transfer valve 21 is opened and second port 21b thereof is closed so as to move the slider 23 of the pressure differential valve 20 to the right to open the second port 20b and close the third port 20c. Under this state, the refrigerant flows in the direction of solid line arrows shown in FIG. 4 in the same manner as in FIG. 1.

To switch the operation from the heating operation to the cooling operation, the transfer valve 21 is reversed. Then, the refrigerant flows in the direction of solid line arrows shown in FIG. 6 but due to leakage of the third port 21c of the transfer valve 21 the leaked refrigerant flows in the direction of dotted line arrows shown in FIG. 6 (from junction $P_1$ to junction $P_2$), thus establishing a relation Pe>Pc. At this time, since a dynamic pressure (Pd−Pe) is applied upon the second port 20b, whereas a dynamic pressure Pd−Pc is applied upon the third port 20c so that a relation Pd−Pe<Pd−Pc is established with the result that the slider 23 would be still maintained at the righthand position shown in FIG. 5, thus preventing transfer of the pressure differential valve.

The transfer valves 2 and 21 can be substituted by two electromagnetic two-way valves, but in such modification too, so long as the prior art pressure differential valve is used it is impossible to transfer the operation.

SUMMARY OF THE INVENTION

Accordingly, it is an object of this invention to provide an improved pressure differential automatic transfer type three-way valve capable of smoothly and automatically transferring by utilizing a pressure differential when the transfer valve is transferred for transferring the operating state of a heat pump type refrigeration system, even when the transfer valve has a leakage.

According to this invention, there is provided a pressure differential automatic transfer type three-way valve utilized in a heat pump type refrigeration system together with a transfer valve for transferring an operating state of the refrigeration system, the three-way valve including a casing and a slider contained therein, the slider being moved by a difference in pressures of refrigerant acting upon opposite sides of the slider caused by transfer operation of the transfer valve for changing flow of the refrigerant through the refrigeration system, wherein the pressure differential automatic transfer type three-way valve is formed with a leakage passage having a leakage resistance $R_4$ expressed by a relation:

$$R_4 < \frac{R_2 R_3}{R_1}$$

where $R_1$ represents flow resistance of the transfer valve, $R_2$ leakage resistance thereof, and $R_3$ flow resistance of the pressure differential automatic transfer type three-way valve.

DESCRIPTION OF THE PREFERRED EMBODIMENTS

Figure 7:
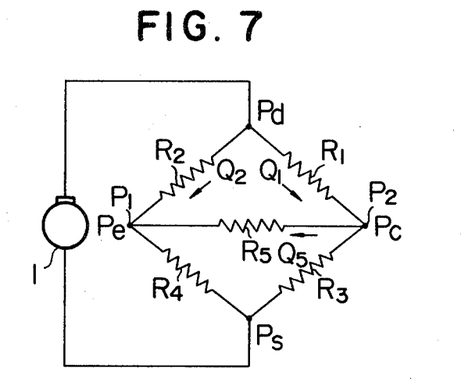
FIG. 7 is an equivalent circuit of the refrigeration system shown in FIG. 1 representing the same as a Wheatstone bridge.

Preferred embodiments of this invention will now be described with reference to FIGS. 7 through 32. FIG. 7 is an equivalent circuit showing the heat pump type refrigeration system shown in FIG. 1 when it is transferred to the operation state shown in FIG. 3. The flow quantity Q of the refrigerant in the system and its flow resistance R can be shown with a diagram similar to a Wheatstone bridge. In FIG. 7, $R_2$ represents the leakage resistance of the second port $2b$ of the transfer valve 2, $R_1$ the flow resistance of the third port $2c$ thereof, $R_4$ the leakage resistance of the second port $3b$ of the pressure differential valve 3, $R_3$ the flow resistance of the third port $3c$ thereof, $Q_2$ the leakage quantity of the refrigerant, $Q_1$ the flow quantity of the refrigerant through the third port $2c$ of the transfer valve 2, $Q_5$ the flow quantity of the refrigerant flowing between junctions $P_1$ and $P_2$.

In fluid technology, the following equation holds as shown by Weisbach's equation $$\Delta P = P_1 - P_2 = \frac{v^2}{2g} \lambda \frac{l}{d} \gamma \qquad (1)$$

where $P_1$ and $P_2$ represent pressures at both ends of a pipe through which fluid flows, $\gamma$ the weight per unit volume of the fluid, $v$ the flow velocity, $d$ the inner diameter of the pipe, $l$ the length thereof, and $\lambda$ the resistance coefficient.

By modifying equation (1), we obtain $$\Delta P \propto \lambda \cdot v^2$$

Since the flow velocity $v$ is proportional to the flow quantity, the following relation holds $$\Delta P \propto R \cdot Q^2 \qquad (2)$$

Accordingly, the leakage pressure loss $Pd - Pe$ of the second port $2b$ of the transfer valve 2 can be expressed as follows:

$$Pd - Pe = R_2 Q_2^2 \qquad (3)$$

In order to move the slider 8 of the pressure differential valve 3 to the left from the state shown in FIG. 2, the pressure Pc must be larger than pressure Pe. In other words, a quantity of refrigerant shown by $Q_5$ in FIG. 7 should flow in the direction of a solid line arrow. Denoting the flow resistance of the pressure reducing device 6 by $R_5$ and the pressure loss $Rd - Rs$ between the transfer valve 2 and the pressure differential valve 3 by $\Delta Pc$, we can obtain the following equations from a well known equation regarding a Wheatstone bridge.

$$Q_1^2 = \Delta Po \frac{R_2(R_3 + R_4 + R_5) + R_4 R_5}{\mathring{\Delta}} \qquad (4)$$

$$Q_2^2 = \Delta Po \frac{R_1(R_3 + R_4 + R_5) + R_3 R_5}{\mathring{\Delta}} \qquad (5)$$

$$Q_5 = \Delta Po \frac{R_2 R_3 - R_1 R_4}{\mathring{\Delta}} \qquad (6)$$

where $\mathring{\Delta}$ is expressed by the following determinant:

$$\mathring{\Delta} \begin{vmatrix} R_1 + R_3 & 0 & -R_3 \\ 0 & R_2 + R_4 & R_4 \\ R_1 & -R_2 & R_5 \end{vmatrix}$$

By solving this determinant we obtain $$\mathring{\Delta} = (R_1 + R_3)(R_2 + R_4)R_5 + (R_1 + R_3)R_2 R_4 + (R_2 + R_4)R_1 R_3.$$

In order to satisfy a relation $Q_5 > 0$, a relation $Q_5^2 > 0$ must be satisfied. Thus, from equation (4) a relation $R_2 R_3 > R_1 R_4$ is sufficient.

In summary, when the leakage resistance $R_4$ of the closed side (second port $3b$) of the pressure differential valve 3 is selected to satisfy a relation $$R_4 < \frac{R_2 R_3}{R_1},$$

the slider 8 can be moved smoothly at the time of transferring the operation state.

Figure 6:
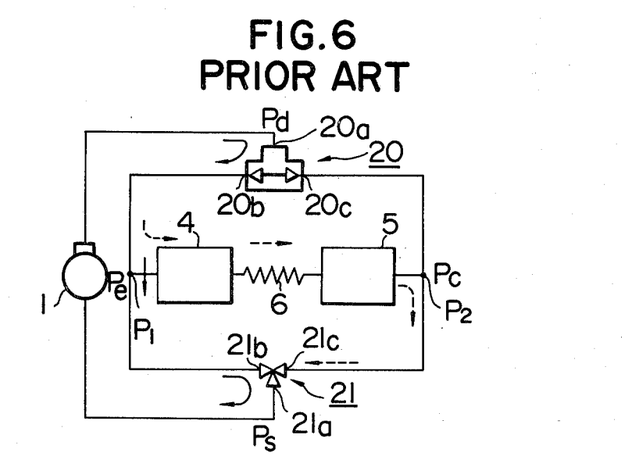
FIG. 6 is a diagram showing the refrigeration system shown in FIG. 5 for explaining the transfer of operation.

The same consideration may be applied to the heat pump type refrigeration systems shown in FIGS. 4 and 6.

The leakage resistance $R_4$ in the pressure differential valve will be discussed as follows.

Figure 8:
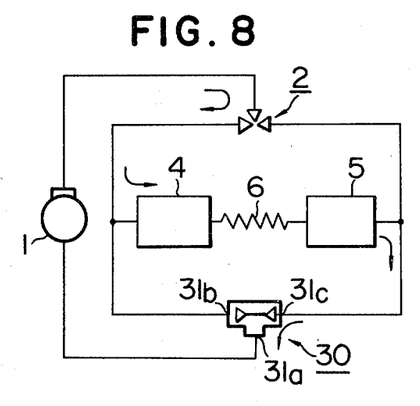
FIG. 8 is a diagram showing the heat pump type refrigeration system utilizing a novel pressure differential valve shown in FIG. 9 and is useful to explain its heating operation.
Figure 9:
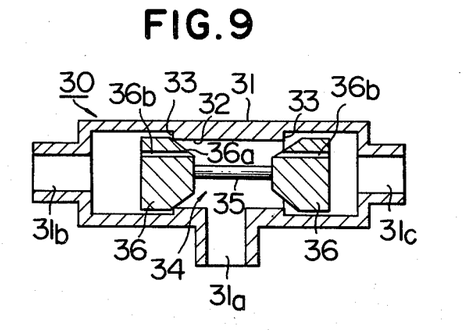
FIG. 9 is a longitudinal sectional view showing the pressure differential valve embodying the invention.

The heat pump type refrigeration system shown in FIG. 8 corresponds to that shown in FIG. 1 and utilizes a pressure differential valve 30 as shown in FIG. 9 which comprises a cylindrical casing 31 provided with outwardly projecting second and third ports $31b$ and $31c$ and a first port $31a$ at the center. A reduced diameter portion 32 is formed at the central portion on the inner surface of the casing 31 and valve seats 33 are formed on both sides of the reduced diameter portion. A slider 34 including valve members 36 secured to the opposite ends of a shaft 35 is contained in the casing, the conical surfaces $36a$ of the valve members 36 cooperating with valve seats 33 to transfer the valve.

Both valve members 36 are formed with axial leakage passages $36b$, the diameter thereof being selected such that their leakage resistances $R_4$ are smaller than $$\frac{R_2 R_3}{R_1}.$$

During the heating operation, the refrigerant flows as shown by solid line arrows in FIG. 8 in the same manner as FIG. 1, and the state of the pressure differential valve 30 at this time is shown in FIG. 9, which is the same as that shown in FIG. 2.

Figure 10:
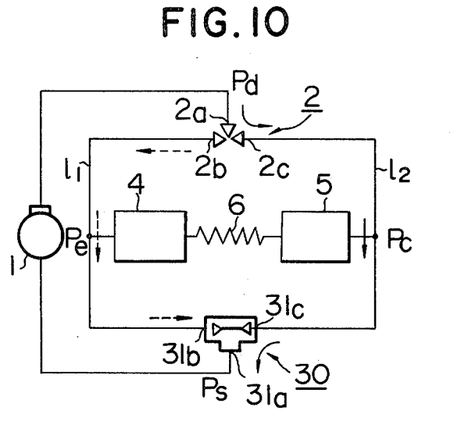
FIG. 10 is a diagram showing the refrigeration system shown in FIG. 8 at the time of transferring its operation.
Figure 11:
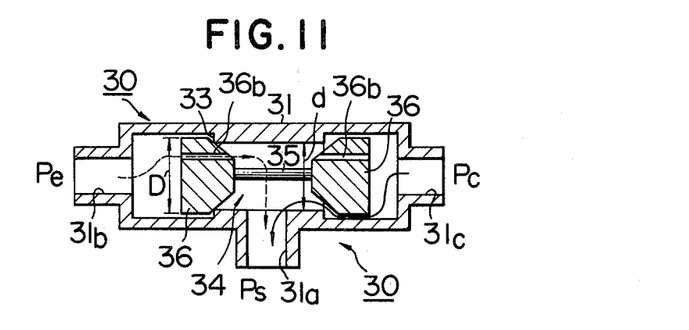
FIG. 11 is a longitudinal sectional view showing the pressure differential valve shown in FIG. 9 during the transfer of operation.

When the operation state is transferred to the cooling operation state as shown in FIG. 10 from the heating state, leaked refrigerant flows through pipe $l_1$ as shown by dotted line arrows to enter into the pressure differential valve 30 through its second ports $31b$ and then flows out of the first port $31a$ via the leakage passage $36b$ of the valve member 36 (see FIG. 11).

Provision of the leakage passages $36b$ creates a relation $Pc > Pe$ so that the pressure differential applied to the second port $31b$ of the pressure differential valve is expressed by $(Pe - Ps)A$, where A represents the cross-sectional area of the valve seat 33. Since this pressure differential is larger than the pressure differential $(Pc - Ps)A$ acting upon the third port $31c$, the slider 35 is moved toward left as shown in FIG. 12 to open the second port 31b and close the third port 31c.

Figure 13:
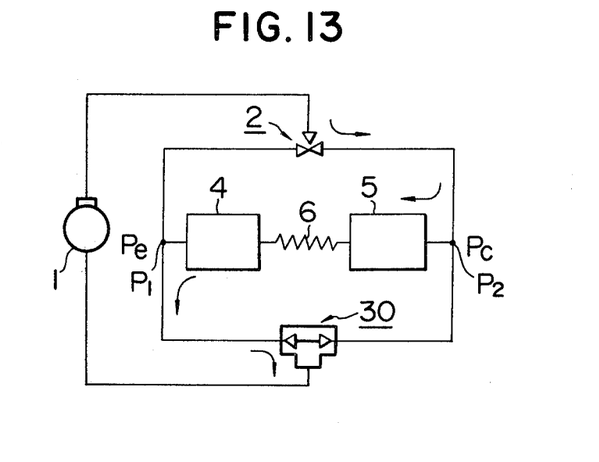
FIG. 13 is a diagram showing the state of the refrigeration system shown in FIG. 11 after completion of the transfer of operation.
Figure 14:
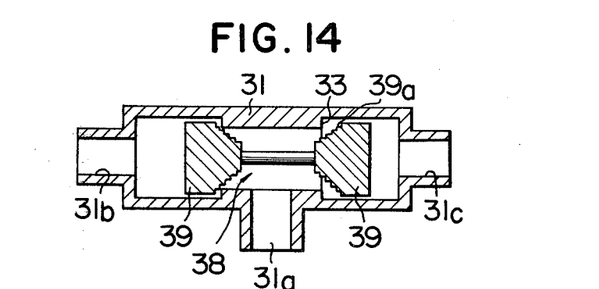
FIG. 14 is a longitudinal sectional view showing a modified pressure differential valve of this invention.

Consequently, the refrigerant entered into the second port 31b flows to the compressor 1 via the gap between the valve member 36 and the inner surface of the casing 31 and via the first port 31a. When the transfer of the slider 34 completes, the refrigerant flows in the system as shown by solid line arrows shown in FIG. 13 so as to effect the cooling operation. Instead of providing a leakage passage 36b in the form of an opening, the same object can be accomplished by forming steps on the conical surface 39a of the valve member 39 or making coarse the conical surface or valve seat 33, as shown in FIG. 14.

Figure 12:
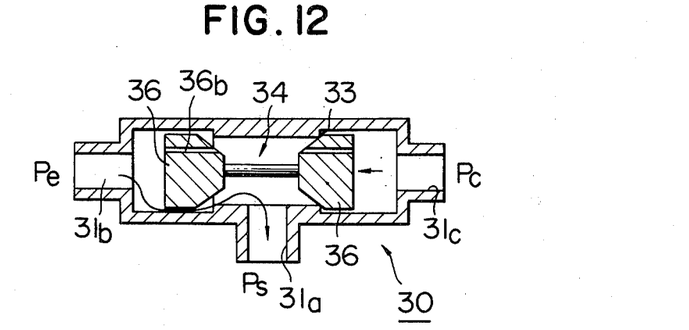
FIG. 12 is a longitudinal sectional view showing the pressure differential valve after completion of the transfer of operation.

The slider 34 of the pressure differential valve 30 shown in FIGS. 9, 11 and 12 is formed with a leakage passages 36b, so that the refrigerant normally flows through these leakage passages thus decreasing the efficiency. However, decrease in the efficiency can be obviated by constructing the pressure differential valve such that a leakage passage will be formed only at the time of transfer as will be described as follows.

Figure 15:
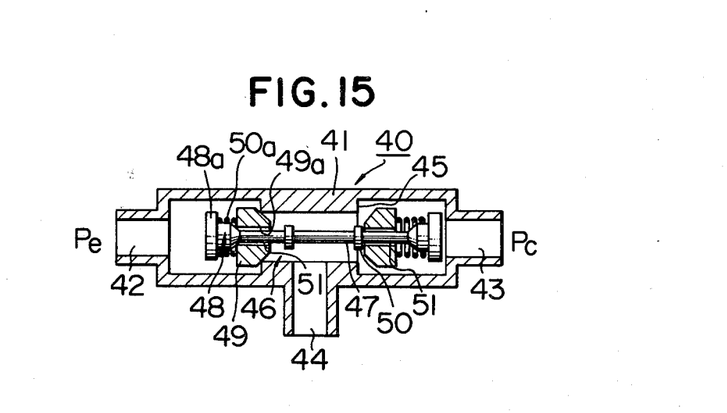
FIG. 15 is a longitudinal sectional view showing still another modification of the pressure differential valve according to this invention.
Figure 16:
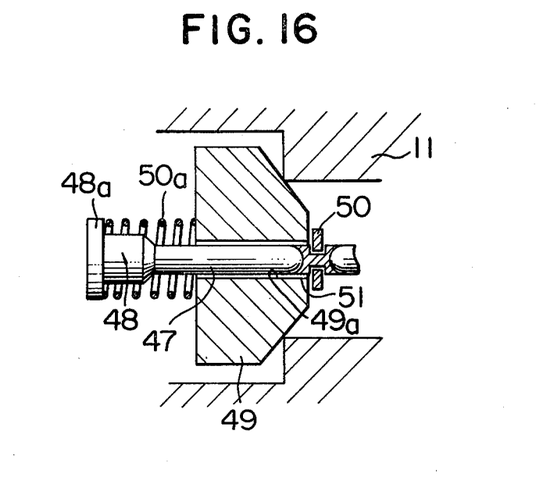
FIG. 16 is an enlarged view of a portion of the pressure differential valve shown in FIG. 15.

The pressure differential valve 40 shown in FIGS. 15 and 16 has a casing 41, a second port 42, a third port 43, a first port 44 and a valve seat 45 which have the same construction as those shown in FIG. 9.

More particularly, a slider 46 contained in the casing 41 has a shaft 47 formed with pilot valves 48 on both ends, and slide valve members 49 are loosely mounted on the shaft 47 between flanges 50 thereof and the pilot valves 49. Compression springs 50a are provided between flanges 48a at the outer ends of the pilot valves 48 and the slide valve members 49 for urging the pilot valves 48 from the slide valve members 49.

As shown in FIG. 16, at the center of each slide valve 49 is formed a passage 49a having a larger diameter than shaft 47 for forming a leakage passage 51.

At the time of the heating operation, the second port 42 is closed and the third port 43 is open as shown in FIG. 15. At this time, since Pe>Pc, the pilot valve 48 on the side of the second port 42 approaches slide valve member 49 while compressing spring 50a so as to close the leakage passage 51. Thus, under a normal operating state of the refrigeration system, since the leakage passage is closed, it is possible to prevent decrease in the efficiency.

At an instant when the transfer valve 2 is transferred from the heating operation to the cooling operation, as the pressure Pe decreases, the compression spring 50a moves the pilot valve 48 away from the slide valve member 49 to open the leakage passage 51 permitting leakage of the refrigerant. (see FIG. 16). As a consequence, a relation Pc>Pe is established to move the slider 46 to the left, thus effecting transfer of flow passages. Meanwhile the pilot valve 48 on the side of the third port 43 approaches the slide valve 49 to close the leakage passage 51. When transferring the operation from cooling to heating the pressure differential valve 40 operates in a direction opposite to that described above.

Figure 17:
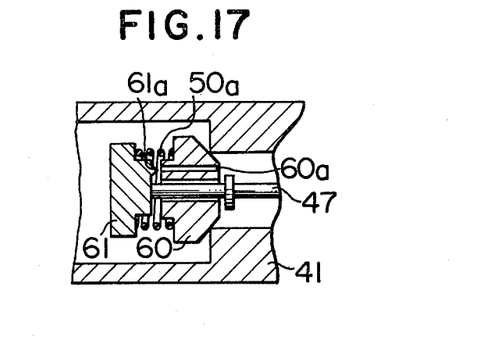
FIG. 17 is a partial longitudinal sectional view showing still another embodiment of the pressure differential valve according to this invention.

While in the pressure differential valve shown in FIG. 15, the leakage passage 51 was formed between the shaft 47 and the opening 49a in the slide valve member, the leakage passage may be provided by forming an axial perforation 60a through the slide valve member 60 and by closing the perforation 60a by a projection 61a formed on the inner side of the pilot valve 61 as shown in FIG. 17.

With this construction it is possible to slidably and relatively snugly fit the slide valve member 60 on the shaft 47 thus ensuring smooth movement of the slide valve member 60.

Figure 18:
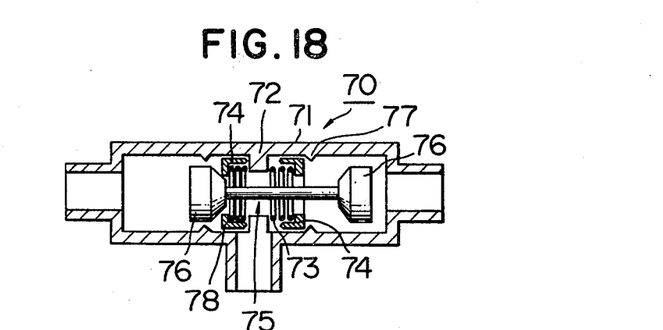
FIG. 18 is a longitudinal sectional view showing yet another modification of the pressure differential valve according to this invention.
Figure 19:
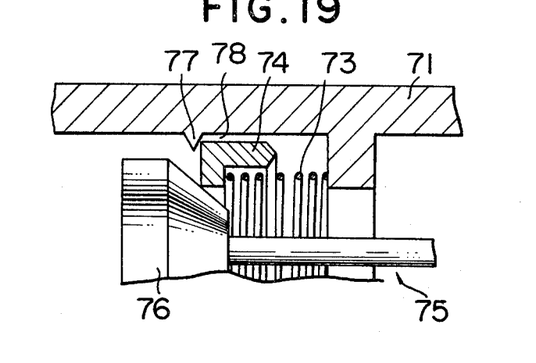
FIG. 19 is a partial longitudinal sectional view useful to explain the operation of the pressure differential valve shown in FIG. 18.

FIG. 18 shows a modified pressure differential valve 70 that operates in the same manner as that shown in FIG. 15. The pressure differential valve 70 shown in FIG. 18 has an annular projection 72 at the inner center of a casing 71 and annular slide rings 74 on the opposite sides of the projection 72 and urged by springs 73, the slide rings 74 being provided with central openings.

A slider 75 is contained in the casing 71 and valve members 76 are mounted on the opposite ends of the shaft of the slider 75 to engage and disengage the openings of the slide rings 74 to transfer the flow passages of the refrigerant.

The axial movements of the slide rings 74 are limited by projections or stops 77 on the inner surface of the casing. The slide rings 74 are loosely fitted in the casing 71 so as to define a leakage passage 78 therebetween.

At an intermediate state between heating and cooling, the slider 75 is in the left or right hand position (see FIG. 18). Under this state one of the valve member 76 urges the slide ring 74 against the force of spring 73 to press the inner end of the slide ring 74 against one side of the projection 72 to close the leakage passage 78. By an action similar to that of the pressure differential valve shown in FIG. 15, at an instant of transfer of the operation, spring 73 moves the slide ring 74 together with the valve member 76 to open the leakage passage 78, so that the refrigerant flows through this passage to reverse the pressures acting upon the left and right sides of the slider 75, thus switching the valve.

A pressure differential valve utilized on the high pressure side as shown in FIG. 4 will now be described.

Figure 20:
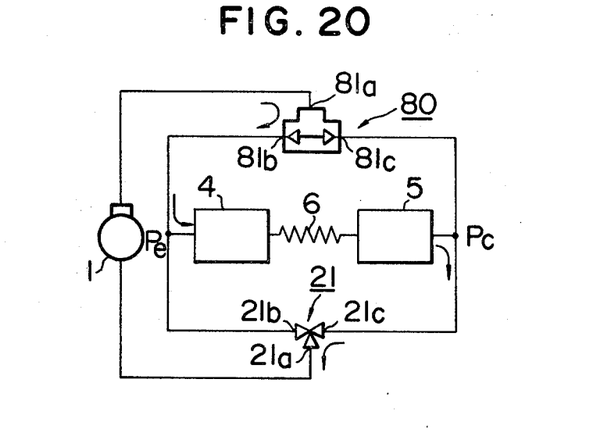
FIG. 20 is a diagram showing a heat pump type refrigeration system at the time of heating operation utilizing the pressure differential valve of this invention on the high pressure side.
Figure 21:
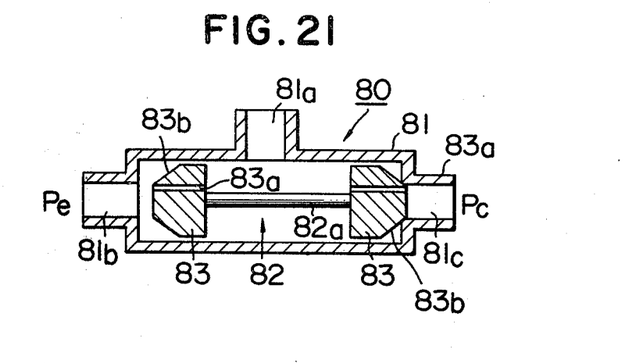
FIG. 21 is a longitudinal sectional view showing the pressure differential valve utilized in the refrigeration system shown in FIG. 20.

For a heat pump type refrigeration system shown in FIG. 20, a pressure differential valve 80 as shown in FIG. 21 is used which has a cylindrical casing 81 provided with a first port 81a at the center, a second port 81b and a third port 81c on the opposite ends and containing a slider 82. The slider 82 comprises a shaft 82a and valve members 83 on both ends thereof and loosely received in the casing. These valve members 83 are provided with axial leakage passages 83a and inclined or conical surfaces 83b adapted to open and close the ports 81b and 81c respectively for switching the flow of the refrigerant.

Figure 22:
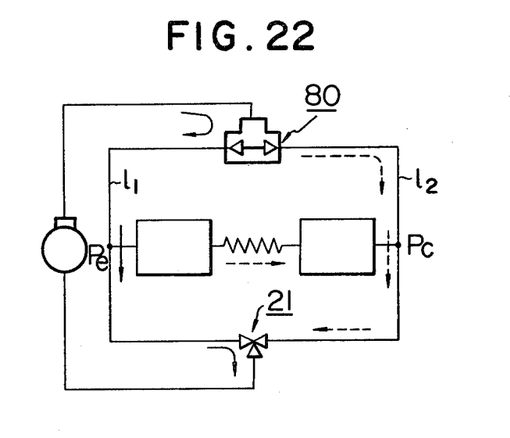
FIG. 22 is a diagram showing the state of the refrigeration system shown in FIG. 20 at the time of transferring operation.
Figure 23:
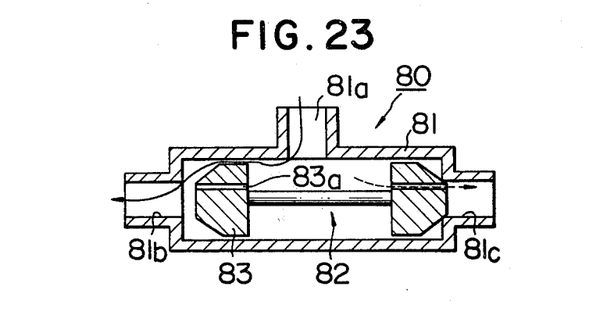
FIG. 23 is a longitudinal sectional view of the pressure differential valve utilized in the system shown in FIG. 22 and showing the state thereof at the time of transferring operation.
Figure 24:
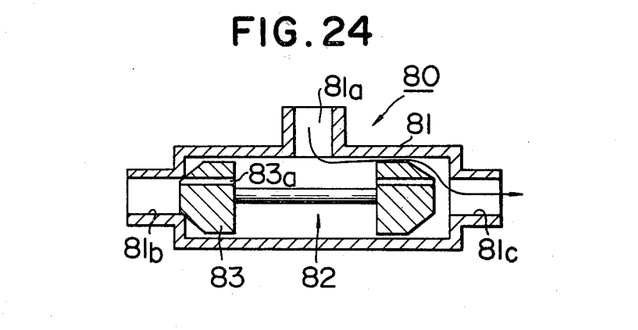
FIG. 24 is a longitudinal sectional view of the pressure differential valve showing the state thereof after completion of the transfer of operation.
Figure 25:
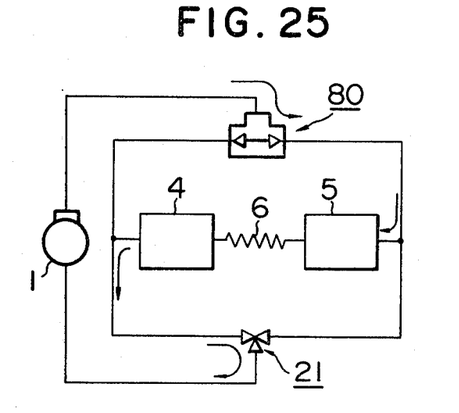
FIG. 25 is a diagram showing the state of the refrigeration system shown in FIG. 20 after completion of the transfer of operation.

During the heating operation, the second port 81b is opened and the third port 81c is closed so that the refrigerant flows as shown by solid line arrows in FIG. 20. When the transfer valve 21 is transferred from this state to the cooling operation, since there is a leakage in the third port 21 of the transfer valve 21, at this instant, as shown in FIGS. 22 and 23, the major portion of the refrigerant flows through pipe $l_1$, while leaked refrigerant flows through pipe $l_2$ and the leakage passage 83a of the valve member 83 on the side of the third port 81c as shown by dotted line arrows shown in FIG. 22 so that a relation Pc>Pe is established to move the slider 82 to the left as shown in FIG. 24, thereby opening the third port 81c and closing the second port 81b. Consequently, the refrigerant flows as shown by solid line arrows shown in FIG. 25 thus transferring to the cooling operation.

Figure 26:
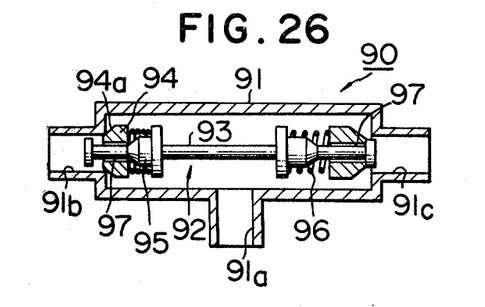
FIG. 26 is a longitudinal sectional view showing a further embodiment of the pressure differential valve according to this invention.
Figure 27:
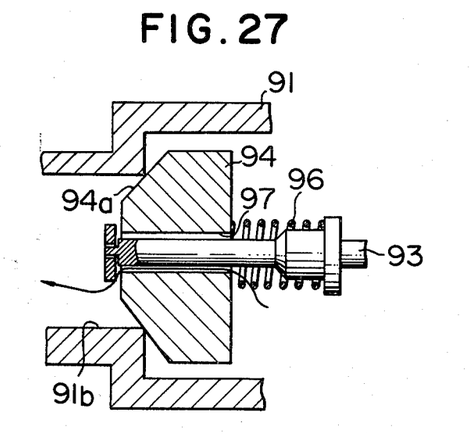
FIG. 27 is an enlarged longitudinal sectional view of a portion of the valve shown in FIG. 26 and is used to explain the operation thereof.

The pressure differential valve 90 shown in FIG. 26 corresponds to that 40 (FIG. 15) provided on the low pressure side and comprises a cylindrical casing 91 containing a slider 92. The slider 92 includes a shaft 93, a pair of slide valve member 94 slidably mounted on the opposite side of the shaft 93, pilot valves 95 secured to the shaft 93 on the inside of the slide valve members, and springs 96 respectively interposed between the slide valve members 94 and the pilot valves 95. The slide valve members 94 are loosely mounted on the shaft 93 to form leakage passages 97 therebetween.

During the cooling and heating operations, one port 91b is closed by the conical surface 94a of the slide valve member 94, whereas the other port 91c is open. The pilot valve 95 on the side of the port 91b approaches the slide valve member 94 while compressing spring 96 to close the leakage passage 97. At an instant of transferring the operation state, the pressure acting upon the port 91c lowers so that the pilot valve 95 opens the leakage passage 97 against the force of spring 96. Thus, the refrigerant flowing into the port 91c leaks into the port 91b through the leakage passage 97 whereby the slider 92 can move in the opposite direction.

Figure 28:
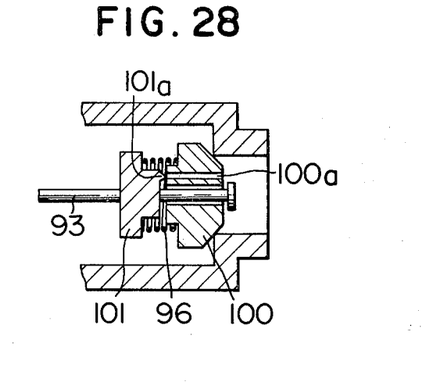
FIG. 28 is a partial longitudinal sectional view showing still further modification of the pressure differential valve embodying the invention.

Alternatively, as shown in FIG. 28 a slide valve member 100 may be slidably mounted on a shaft 93 (with any appreciable gap therebetween), while an axial leakage passage 100a is formed through the slide valve member 100 so as to close the leakage passage 100a by a projection 101a formed on the inner end of the pilot valve 101.

Figure 29:
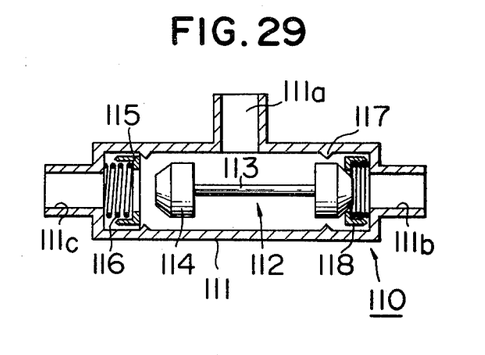
FIG. 29 is a longitudinal sectional view showing another embodiment of the pressure differential valve according to this invention.

The pressure differential valve 110 shown in FIG. 29 corresponds to the pressure differential valve 70 shown in FIG. 18 and comprises a slider 112 contained in a cylindrical casing 111 having ports 111a, 111b and 111c. The lider 112 has valve members 114 secured to the opposite ends of a shaft 113, and annular slide rings 115 are provided at both ends of the casing corresponding to valves 114. Springs 116 are interposed respectively between the slide rings and the opposite ends of the casing 111 for urging the slide rings toward the center of the casing. The movements of the slide rings 115 are limited by projections or stops 117 on the inner surface of the casing 111.

Figure 30:
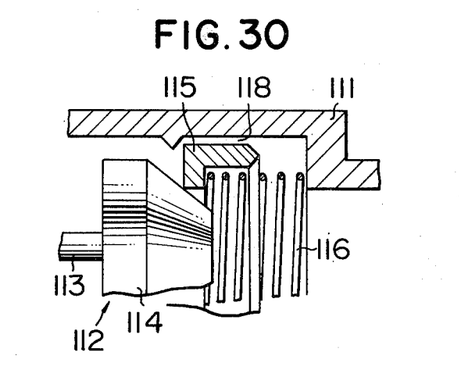
FIG. 30 is a partial longitudinal sectional view showing the pressure differential valve shown in FIG. 29 for explaining the operation thereof.

Slide rings 115 have an outer diameter smaller than the inner diameter of the casing 111 so as to form leakage passages 118 therebetween which are opened at the time of transferring the operation as shown in FIG. 30 but closed during normal operation to prevent decrease in the efficiency of the system.

Taking FIG. 11 as an example, the theory of the transfer action of the slider 34 will be described. When the diameter of the valve seat 33 is denoted by d, a differential pressure $$(Pe - Ps)\frac{\pi}{4} d^2$$

will be applied to the valve member 36 on the side of the second port 31b, while a differential pressure $$(Pc - Ps)\frac{\pi}{4} d^2$$

to the valve member 36 on the side of the third port 31c. Because a portion which creates the pressure differential, that is a portion that forms the passage of the refrigerant has a diameter d. Consequently, the transfer force acting upon the slider 34 is caused only by the difference between the pressures Pc and Pe and only a small pressure differential is applied to the maximum diameter portion D at the rear end of the valve member 36 which is not sufficient to actuate the transfer valve.

Figure 31:
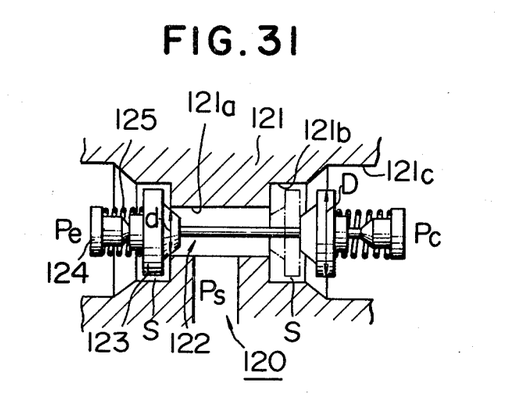
FIG. 31 is a longitudinal sectional view showing still another embodiment of the pressure differential valve according to this invention.

An imporved pressure differential valve 120 shown in FIG. 31 can produce sufficiently large transfer force. In this valve, the inner surface of a casing 121 is provided with three stepped portions. Thus, it is formed with a small diameter portion 121a at the center, medium diameter portions 121b on the outer sides thereof, and large diameter portions 121c at the outermost portions. The slider 122 has the same construction as that shown in FIG. 13 and its slide valves 123 are proportioned to define gaps S between their peripheries and the medium diameter portions.

At an instant of transferring the operation state, when the lefthand pilot valve 124 is moved to the left by the force of a spring 125, the righthand slide valve 123 enters into the medium diameter portion 121b to form the gap S.

Consequently, the differential pressure acting upon the righthand side of slider 122 becomes $$(Pc - Ps)\frac{\pi}{4} D^2,$$

while that acting upon the lefthand side thereof becomes $$(Pe - Ps)\frac{\pi}{4} D^2.$$

Since D>d, the force F tending to move the slider 122 to the left is shown by $$F = \frac{\pi}{4} D^2(Pc - Ps) - \frac{\pi}{4} d^2(Pe - Ps).$$

This equation shows that, since D>d, even when the difference between the pressures Pc and Pe is small, the force F increases, meaning smooth movement of the slider 122. Upon completion of the transfer, the lefthand slide valve 123 leaves the medium diameter portion 121b, thus decreasing the pressure loss during normal operation.

Figure 32:
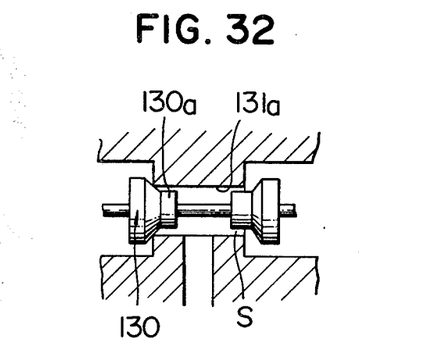
FIG. 32 shows a partial longitudinal section showing yet another embodiment of the pressure differential valve according to this invention.

In the pressure differential valves shown in FIGS. 15 and 17, it is necessary to accurately determine such dimensions of the component parts as the length of the slider shaft 47, the gap of the valve seat, etc., for the purpose of assuring accurate gaps between slide valves 49 and 60 and respective valve seats necessary to pass the refrigerant. Otherwise such problems are resulted as making it impossible to assume minute gaps, to form proper gaps on both sides of the slider, or making the gaps to be excessively large thus failing to obtain necessary pressure loss. The necessary gap S can be ensured by forming cylindrical projections 130a on the inner ends of the slide valves 130 and inserting the cylindrical projections into the small diameter portion 131a of the casing 131 as shown in FIG. 32.

As above described according to this invention, even when there is a leak through the transfer valve, it is possible to smoothly vary the pressures on both sides of the slider of a pressure differential valve so as to move the slider, thus enabling to transfer the operation state of the refrigeration system accurately and in a short time.

I claim:

1. In a pressure differential automatic transfer type three-way valve utilized in a heat pump type refrigeration system together with a transfer valve for transferring an operation state of said refrigeration system, said three way valve including a casing and a slider contained therein, said slider being moved by a difference in pressures of refrigerant acting upon opposite sides of said slider caused by transfer operation of said transfer valve for changing flow of said refrigerant through said refrigeration system, the improvement wherein said pressure differential automatic transfer type three-way valve is formed with a leakage passage having a leakage resistance $R_4$ expressed by a relation $$R_4 < \frac{R_2 R_3}{R_1}$$

where $R_1$ represents flow resistance of said transfer valve, $R_2$ leakage resistance thereof, and $R_3$ flow resistance of said pressure differential automatic transfer type three-way valve.

2. The pressure differential automatic transfer type three-way valve according to claim 1 wherein said refrigeration system comprises a compressor and said pressure differential automatic transfer type three-way valve is installed on a suction side of said compressor.

3. The pressure differential transfer type three-way valve according to claim 1 wherein said refrigeration system comprises a compressor and said pressure differential type three-way valve is installed on an output side of said compressor.

4. The pressure differential automatic transfer type three-way valve according to claim 1 wherein said casing is provided with a central port at a central portion thereof and a pair of ports on both sides thereof, and wherein said slider comprises a shaft and valve members mounted on opposite ends of said shaft, said valve members opening and closing refrigerant passages between said central port and said pair of ports and said valve members being formed with axial refrigerant leakage passages respectively.

5. The pressure differential automatic transfer type three-way valve according to claim 4 wherein said central portion of said casing has a reduced inner diameter, and opposing inner ends of said valve members are inclined to engage opposite ends of said reduced diameter central portion which acts as valve seats.

6. The pressure differential automatic transfer type three-way valve according to claim 1 wherein said casing is provided with a central port at a central portion having a reduced inner diameter and a pair of ports on both sides thereof and wherein said slider comprises a shaft and valve members mounted on opposite ends of said shaft, opposing inner surfaces of said valve members are inclined and formed with a plurality of steps, thereby opening and closing refrigerant passages between said central port and said pair of ports while forming refrigerant leakage passages therebetween.

7. The pressure differential automatic transfer type three-way valve according to claim 4 wherein said refrigerant leakage passages are formed between said shaft and said valve members, and each valve member further includes a pilot valve secured to each end of said shaft and spring means interposed between each valve member and the pilot valve associated therewith, each of said pilot valves closing said leakage passage when one of said valve members closes the refrigerant passages between said central port and either one of said pairs of ports.

8. The pressure differential automatic transfer type three-way valve according to claim 4 wherein said refrigerant leakage passages respectively extend through said valve members which are slidably mounted on said shaft, and said slider further includes pilot valves secured to opposite ends of said shaft on the outsides of said valve members, and spring means for urging said pilot valves away from said valve members, said pilot valves being provided with projections on thier inner sides for closing said refrigerant leakage passages.

9. The pressure differential automatic transfer type three-way valve according to claim 1 wherein said casing is provided with a central port at its central portion, a pair of ports at both ends, and an annular projection at a center of an inner surface, and wherein said slider includes a shaft, a pair of valve members secured on both ends of said shaft for closing and opening said pair of ports, annular slide rings respectively interposed between said annular ring and said valve members, and spring means respectively interposed between said annular slide rings and said annular projection, said annular slide rings having a smaller outer diameter than the inner surface of said casing thus forming refrigerant leakage passages therebetween.

10. The pressure differential automatic transfer type three-way valve according to claim 4 wherein end surfaces of said valve members are inclined toward said shaft so as to close and open said pair of ports with said inclined end surfaces.

11. The pressure differential automatic transfer type three-way valve according to claim 1 wherein said casing is provided with a central port at a central portion thereof and a pair of ports on both sides thereof and wherein said slider comprises a shaft, a pair of valve members loosely mounted on both ends of said shaft so as to define refrigerant leakage passages between said valve members and said shaft, said valve members opening and closing refrigerant passages between said central port and said pair of ports, a pair of pilot valves secured to said shaft on the inside of said valve members, and spring means respectively interposed between said valve members and said pilot valves.

12. The pressure differential automatic transfer type three-way valve according to claim 1 wherein said casing is provided with a central port at a central portion thereof and a pair of ports on both sides thereof and wherein said slider comprises a shaft, a pair of valve members slidably mounted on both ends of said shaft, said valve members being provided with refrigerant leakage passages extending therethrough, and acting to open and close refrigerant passages between said central port and said pair of ports, a pair of pilot valves secured to said shaft on the inside of said valve members, and spring means respectively interposed between said valve members and said pilot valves.

13. The pressure differential automatic transfer type three-way valve according to claim 1 wherein said casing is provided with a central port at its central portion, a pair of ports at both ends, stop members formed on an inner surface of said casing and located on the inner sides of said pair of ports, annular slide rings respectively interposed between said pair of ports and said stop members for forming refrigerant leakage passages between outer surfaces of said annular slide rings and an inner surface of said casing, and spring means for urging said annular rings against said stop members, and wherein said slider comprises a shaft contained in said casing, and valve members mounted on both ends of said shaft for opening and closing inner openings of said slide rings, thereby opening and closing refrigerant passages between said central port and said pair of ports.

14. The pressure differential automatic transfer type three-way valve according to claim 1 wherein said casing is provided with a reduced diameter portion at a central portion, opposite ends of said reduced diameter portion forming valve seats, larger diameter portions on the outer sides of said reduced diameter portion, a central port opened in said reduced diameter portion, and a pair of ports on both ends of said casing and wherein said slider comprises a shaft contained in said casing, a pair of valve members slidably mounted on said shaft near opposite ends thereof, each valve member having an inner conical member cooperating with one of said valve seats and an outer disc shaped member axially movable in one of said large diameter portions, pilot valves mounted on both ends of said shaft and spring means respectively interposed between said pilot valves and said valve members for urging said conical members against said valve seats.

15. The pressure differential automatic transfer type three-way valve according to claim 1 wherein said casing is provided with a reduced diameter portion at a central portion, opposite ends of said reduced diameter portion forming valve seats, larger diameter portions on the outer sides of said reduced diameter portion, a central port opened in said reduced diameter portion, and a pair of ports on both ends of said casing and wherein said slider comprises a shaft contained in said casing, a pair of valve members secured to opposite ends of said shaft, each valve member having disc shaped member contained in each of said larger diameter portions, a conical member on the inside of said disc shaped member for engaging and disengaging said valve seat, and a cylindrical member mounted on the inside of said conical member and movable in said reduced diameter portion of said casing.

* * * * *